(12) United States Patent
Gutgsell et al.

(10) Patent No.: US 6,348,660 B1
(45) Date of Patent: *Feb. 19, 2002

(54) ELECTRICAL RACEWAY ASSEMBLY

(75) Inventors: David R. Gutgsell; Kenneth A. Kern; Lawrence Rapier, all of Jasper, IN (US)

(73) Assignee: Ditto Sales, Inc., Jasper, IN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/173,818

(22) Filed: Oct. 16, 1998

Related U.S. Application Data

(63) Continuation-in-part of application No. 09/082,128, filed on May 20, 1998, now Pat. No. 6,137,057.

(51) Int. Cl.$^7$ .................................................. H02G 3/04
(52) U.S. Cl. ......................... 174/68.3; 174/95; 174/101
(58) Field of Search ............................... 174/68.1, 68.3, 174/95, 96, 97, 98, 100, 101; 52/287.1

(56) References Cited

U.S. PATENT DOCUMENTS

| | | | |
|---|---|---|---|
| 3,786,171 A | * | 1/1974 | Shira ............................ 174/48 |
| 4,017,137 A | | 4/1977 | Parks |
| 4,183,601 A | | 1/1980 | Barber et al. |
| 4,188,765 A | | 2/1980 | Jackson |
| 4,277,123 A | | 7/1981 | Haworth et al. |
| 4,370,008 A | | 1/1983 | Haworth et al. |
| 4,372,629 A | | 2/1983 | Propst et al. |
| 4,377,724 A | | 3/1983 | Wilson |
| 4,382,986 A | | 5/1983 | Reuben |
| 4,406,101 A | * | 9/1983 | Heidmann ................... 52/200 |
| 4,594,826 A | | 6/1986 | Gray |

(List continued on next page.)

Primary Examiner—Dean A. Reichard
Assistant Examiner—W. David Walkenhorst
(74) Attorney, Agent, or Firm—Baker & Daniels

(57) ABSTRACT

An electrical raceway assembly for use with a structure is provided, comprising an elongated raceway engageable to the structure and having a length, a transverse base and a pair of opposite upstanding sidewalls extending along the length to define at least one channel configured for retaining electrical wires. A cover attachable to the raceway to occlude a portion of the channel is included. The cover includes an elongated face plate having an interior surface and an exterior surface. The cover is configured for snap fit engagement with the raceway. One end of the cover is rotatable, about a longitudinal axis of the raceway, between an open position in which a portion of a channel of the raceway is exposed and a closed position in which the other end of the cover is engaged to the raceway. A flange extends from one of the portions of the cover. The flange is relatively more flexible other elements of the cover and occludes an area behind the flange when the cover is attached to the raceway and the flange being elastically deformable to allow access to the area. In one embodiment, a living hinge is defined in the cover between the face plate and the rotatable end of the cover. The living hinge is elastically deformable to permit pivoting of the face plate relative to the rotatable end of the cover, thereby permitting greater access behind the cover.

14 Claims, 16 Drawing Sheets

U.S. PATENT DOCUMENTS

| | | | |
|---|---|---|---|
| 4,647,715 A | | 3/1987 | Butler |
| 4,717,358 A | | 1/1988 | Chaundy |
| 4,762,072 A | | 8/1988 | Boundy et al. |
| 4,792,881 A | | 12/1988 | Wilson et al. |
| 4,874,322 A | | 10/1989 | Dola et al. |
| 4,918,886 A | | 4/1990 | Benoit et al. |
| 4,942,271 A | * | 7/1990 | Corsi et al. ............... 174/101 |
| 5,024,614 A | * | 6/1991 | Dola et al. ................. 439/114 |
| 5,091,607 A | * | 2/1992 | Stob ............................ 174/48 |
| 5,092,786 A | | 3/1992 | Jublin et al. |
| 5,092,787 A | | 3/1992 | Wise et al. |
| 5,231,562 A | | 7/1993 | Pierce et al. |
| 5,244,401 A | | 9/1993 | Russell et al. |
| 5,336,097 A | | 8/1994 | Williamson et al. |
| 5,373,108 A | | 12/1994 | Ysbrand |
| 5,451,101 A | | 9/1995 | Ellison et al. |
| 5,694,726 A | * | 12/1997 | Wu ............................ 52/287.1 |
| 5,704,175 A | | 1/1998 | Lewis |
| 5,728,976 A | * | 3/1998 | Santucci et al. ............ 174/135 |
| 5,877,451 A | * | 3/1999 | Zimmerman ............... 174/68.3 |
| 6,084,180 A | * | 7/2000 | DeBartolo, Jr. et al. ...... 174/95 |
| 6,137,057 A | * | 10/2000 | Gutgsell .................... 174/101 |

\* cited by examiner

ELECTRICAL RACEWAY ASSEMBLY

RELATED APPLICATIONS

The present application is a continuation-in-part of U.S. application Ser. No. 09/082,128, filed on May 20, 1998 in the name of inventor David R. Gutgsell and assigned to the assignee of the present application, now U.S. Pat. No. 6,137,057.

FIELD OF THE INVENTION

The present invention relates to the electrification of structures, particularly office furniture and partitions, dividers and panels used to form office cubicles. Specifically, the invention concerns electrical raceway systems and covers for raceways to shield cables and wires housed within.

BACKGROUND OF THE INVENTION

As the cost of doing business has increased due to increases in costs of personnel, insurance, office space and the like, a trend for downsizing has developed. This trend along with the expanding presence of small businesses has created a pressure for economy in the workplace. Part of this economy is that a space may be required to fulfill more than one role. At the same time, an awareness of the effects of office aesthetics on morale and productivity has created a desire for pleasant and efficient workspaces. To meet these needs, attractive yet portable training, conference and office furniture is marketed by Versteel, P.O. Box 850, Jasper, Ind. 47547 (800-876-2120). Also, in many cases, open office plans must be divided into individual offices or workstations. Many arrangements are available to divide an open office space, including partition panels, systems furniture, and modular furniture.

Such workstations typically require specific features for maximum functionality: power supply, communication ports and keyboard or other support tools. However, in open office space, work structures may be placed in locations that are not easily accessible to the office space electrical and communication ports. Therefore, one challenge with providing power supply and communication access to the desk top of each workstation is wire management. Improper wire management can lead to interruptions in service, workplace hazards and poor aesthetics.

There is a growing need for improved components and systems for accommodating the distribution of electrical power along or in structures. Examples of electrical systems in office furniture panels and modular wall units are disclosed in U.S. Pat. Nos. 4,370,008, 5,231,562 and 5,451, 101. Such systems include raceway enclosures for guiding electrical and communication wires from wall outlets to workstation structures. The raceway system facilitates the extension of both electrical and communication cables along the system in an efficient yet hidden manner, while permitting desired utilization of these cables at selected locations.

In spite of the benefits of such raceway systems, a need has remained for systems that improve the usability, flexibility, dependability, appearance and convenience of such raceway systems, particularly when used with tables or desks.

SUMMARY OF THE INVENTION

Briefly describing one aspect of the invention, an electrical raceway assembly for use with a structure is provided. The assembly includes an elongated raceway engageable to the structure and having a length, a transverse base and a pair of opposite upstanding sidewalls extending along the length to define at least one channel configured for retaining electrical wires. A cover is attachable to the raceway to occlude a portion of the channel. The cover includes an elongated face plate having an interior surface and an exterior surface. The face plate has at first portion and an opposite second portion, each portion extending along a length of the face plate. Attachment means are provided for attaching the first and second portions of the face plate to each of the opposite upstanding sidewalls with the interior surface facing the channel.

A flange extends from one of the portions of the cover plate and occludes an area behind the flange when the cover is attached to the raceway. The flange is relatively more flexible than the other elements of the cover and elastically deformable to allow access to the area. In some embodiments, the flange has a lower durometer than the other elements of the cover, such as the face plate or attachment means. In certain embodiments, the flange is integral with the face plate. In other embodiments the flange is adjacent the second portion and the face plate and is recessed to the face plate.

In another embodiment, one of the side walls of the raceway terminates in a lip, which includes a rounded surface having a radius. The attachment means of the cover includes a groove demned in the first portion that is configured for snap fit engagement with the lip. In some embodiments, a second of the side walls of the raceway terminates in an elongated attachment receptacle and the attachment means of the cover includes a rounded edge of the second portion that is receivable within the attachment receptacle. The rounded edge is configured for snap fit engagement within the receptacle. In specific embodiments the attachment receptacle defines a curved interior portion having an internal radius slightly larger than the radius of the rounded edge for mating with the rounded edge. In another aspect of the invention, the attachment means includes a hinge feature. The rounded edge of the second portion is rotatingly receivable within the attachment receptacle so that the cover is rotatable, about a longitudinal axis of the attachment receptacle, between an open position in which a portion of a channel of the raceway is exposed and a closed position in which the first portion is engaged to the raceway.

In a further embodiment of the invention, an extruded cover includes an elongated face plate of a sufficient hardness and rigidity to support electrical receptacles, cover plates and the like. A first portion of the cover form a latch to engage on edge of an opening in an electrical raceway. A second portion is pivotably engaged to an opposite edge of the raceway opening to the cover can be pivoted between a latched and an unlatched position, or between a position closing the opening of the raceway and a position allowing access to the raceway. As with the previous embodiment, the second portion can include a flange formed of a relatively more flexible, or lower durometer, material than the face plate.

In this embodiment, the cover includes an additional area of lower durometer, or greater flexibility, than the face plate. This portion is situated between the face plate and the second portion that is rotatably engaged to the raceway. This additional lower durometer itself acts as a living hinge to permit pivoting of the face plate relative to the second portion. In certain applications of the invention, the cover is engaged to a raceway that is disposed beneath a table or desk surface, with the raceway opening oriented inward underneath the surface. The living hinge portion allows the cover to swing completely clear of the raceway opening, even under the table or desk.

Accordingly, it is one object of the invention to provide improved electrical raceway systems for work spaces. These and other objects, advantages and features are accomplished according to the devices and assemblies of the present invention.

DESCRIPTION OF THE PREFERRED EMBODIMENTS

Figure 1:
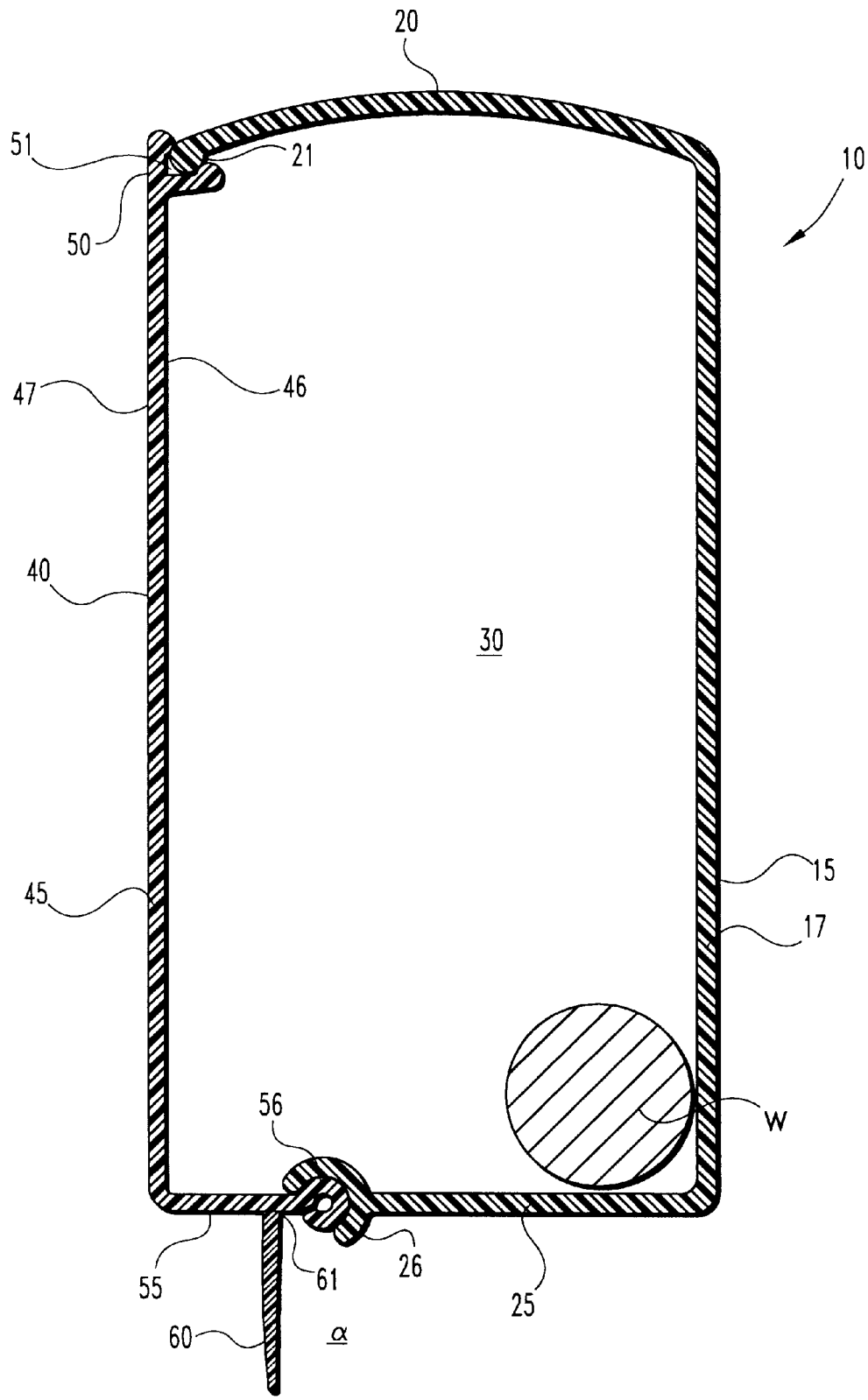
FIG. 1 is side sectional view of an electrical raceway assembly according to one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. The invention includes any alterations and further modifications in the illustrated devices and described methods and further applications of the principles of the invention that would normally occur to one skilled in the art to which the invention relates.

The present invention provides electrical raceway systems and covers for raceways that enhance the functionality and aesthetics of workspaces. The covers are engageable to the raceways in a snap fit engagement that provides secure placement of the cover and allows removal if access to the entire raceway is required. The covers are provided with a pliable flange that occludes an area behind the cover yet allows convenient access to the area for storing electrical cords and the like.

An electrical raceway assembly 10 for attachment to a structure in accordance with a preferred embodiment of the present invention is depicted in FIGS. 1–5. The system 10 includes an elongated raceway 15 engageable to a structure (not shown), such as a desk, table, wall, panel or the like. The raceway 15 has a length L, which preferably extends along a length of the structure to provide power or communication ports at various locations along the structure. The raceway 15 includes a transverse base wall 17 and a pair of opposite upstanding sidewalls 20, 25 extending along the length L of the raceway 15. The walls 17, 20, 25 define a channel 30 configured for retaining and guiding electrical and communication wires W along the length L of the raceway 15. In the embodiment shown in FIG. 1, the channel 30 is U-shaped.

The raceway assembly 10 also includes a cover 40 attachable to the raceway 15 to occlude at least a portion of the channel 30 to shield or protect the contents of the raceway 15 and provide a pleasing appearance to the assembly 10. The cover 40 includes an elongated face plate 45 having an interior surface 46 and an exterior surface 47. The cover face plate 45 also has a first portion 50 and an opposite second portion 55. Each of the portions 50, 55 extend along a length l of the face plate 45. The length l of the face plate 45 may be equal or substantially equal to the length L of the raceway 15 to protect the enclosed wires W and provide a streamlined and aesthetically pleasing appearance to the structure. In some applications it may be desirable to provide several covers 40 for a raceway 15 if the raceway 15 is too long for a single cover 40 to be manageable and convenient.

Attachment means are also provided for attaching the cover 40 to the raceway 15. Preferably, the first and second portions 50, 55 of the face plate 45 are attachable to each of the opposite upstanding sidewalls 20, 25 so that the interior surface 46 faces the channel 30. The cover 40 is preferably configured for snap fit engagement with the racewarn 15. For example, as shown in FIG. 1, one of the sidewalls 20 terminates in a lip 21. The lip 21 includes a rounded surface 22 having a radius $r_1$. The lip 21 is configured for mating engagement with attachment means on the first portion 50. In the embodiment shown in FIGS. 1 and 3, the attachment means includes a groove 51 defined in the first portion 50. The groove 51 is configured for snap fit engagement with the lip 21. In one specific embodiment, the attachment means includes an arm 52 that extends along the length l of the cover 40 and along with the first portion 50 defines the groove 51. In preferred embodiments, the first portion 50 and the arm 52 each terminate in a rounded edge 51a, 52a, respectively to facilitate engagement of the lip 21.

Figure 3:
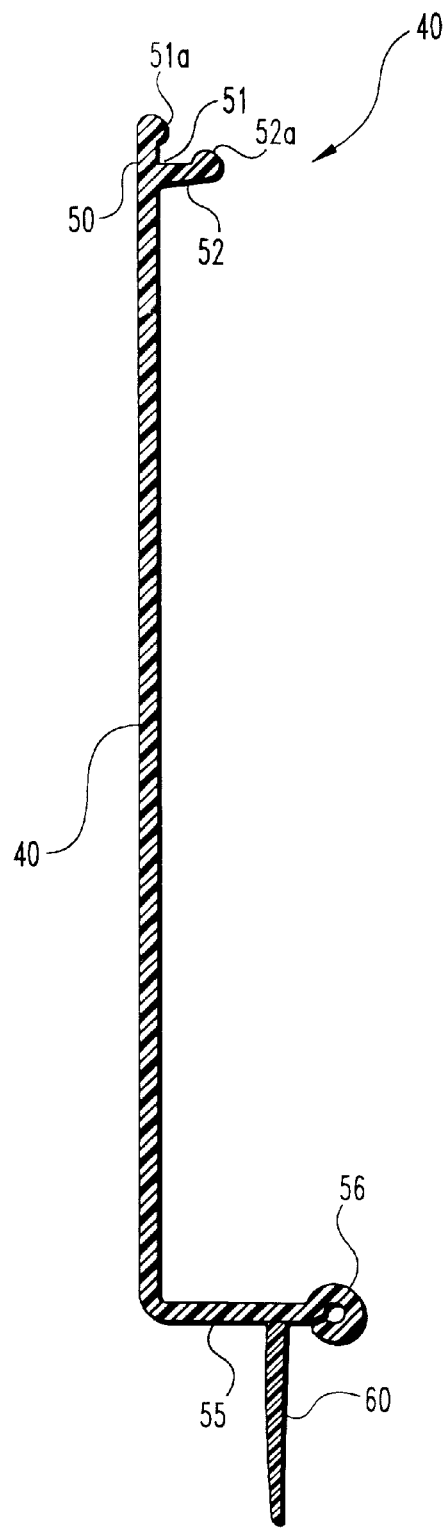
FIG. 3 is a side elevational view of a cover for an electrical raceway according to one embodiment of the present invention.
Figure 4:
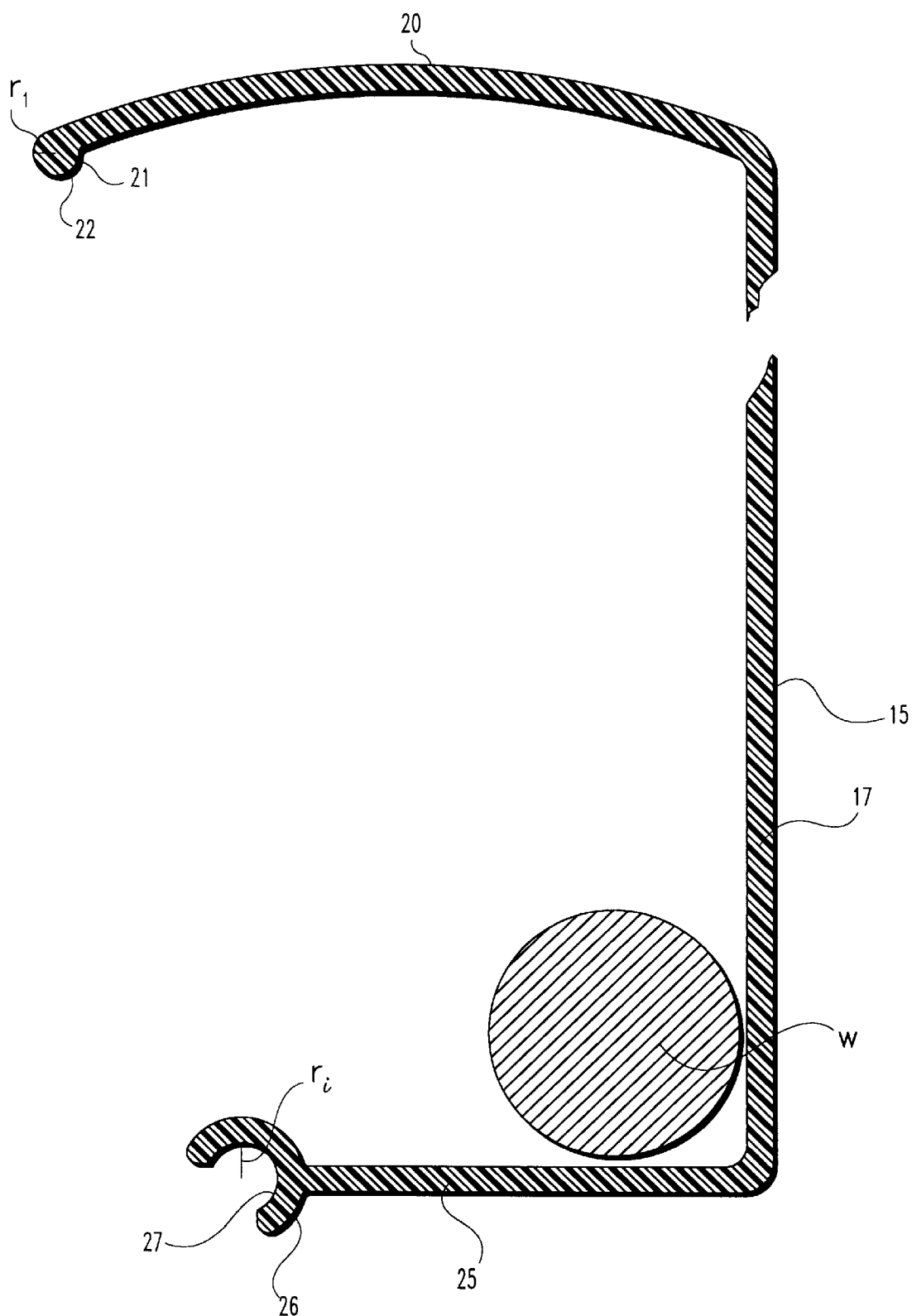
FIG. 4 is a partial side sectional view of cm electrical raceway.
Figure 5:
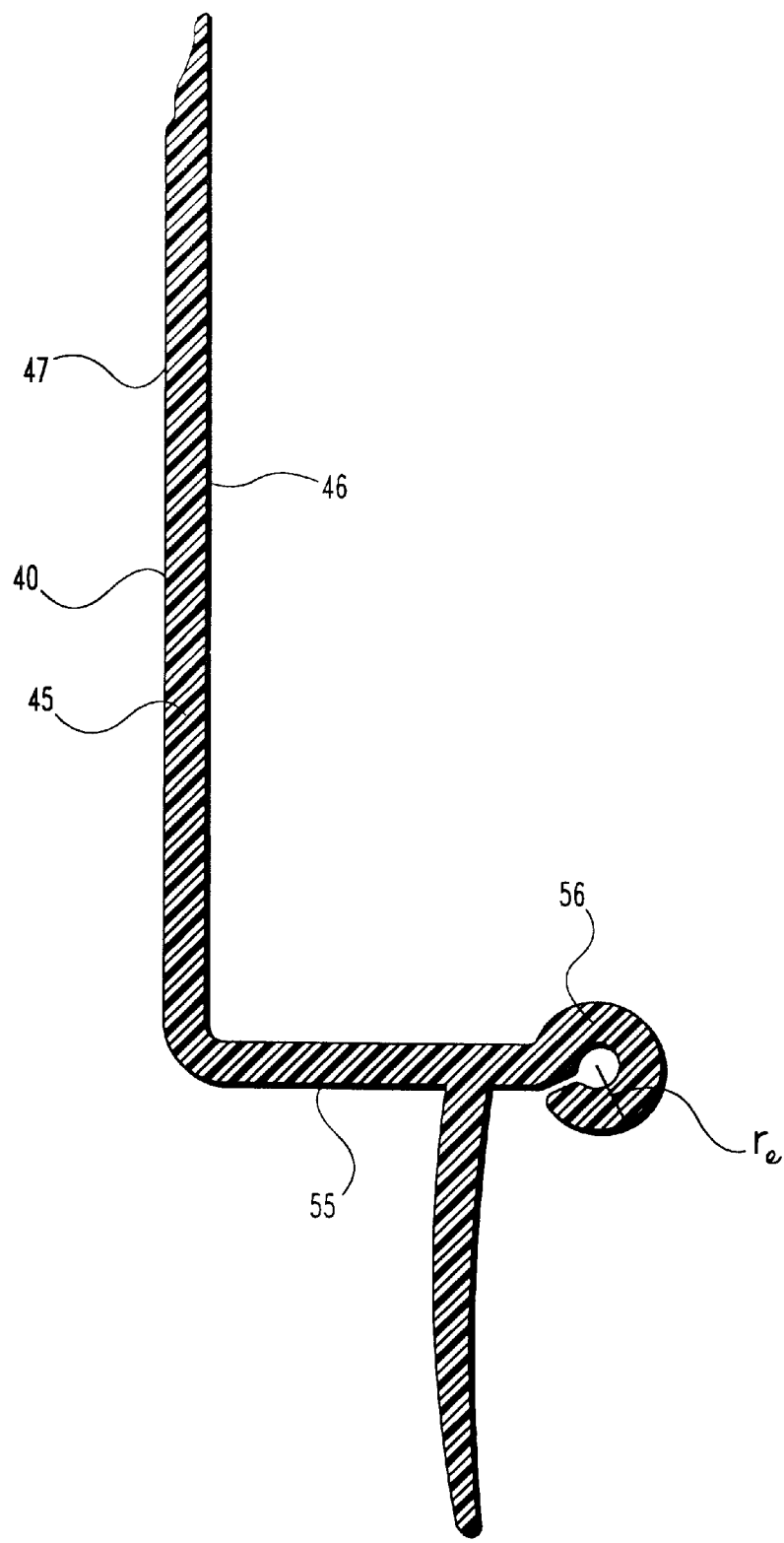
FIG. 5 is a partial side sectional view of a cover for an electrical raceway.

In the embodiment shown in FIGS. 1 and 3, the other side wall 25 of the raceway 15 terminates in an elongated attachment receptacle 26 and the attachment means of the cover 40 includes a rounded edge 56 of the second portion 55. In the particular embodiment shown in FIGS. 1 and 3, the wall 57 of the second portion 55 is curled to form the rounded edge 56. The edge 56 is receivable within the attachment receptacle 26 and is configured for snap fit engagement within the receptacle 26. Preferably, the attachment receptacle 26 defines a curved interior portion 27 having an internal radius $r_1$ slightly larger than the radius $r_e$ of the rounded edge 56 of the second portion 55 for mating with the rounded edge 56 as depicted in FIGS. 4 and 5.

Figure 6:
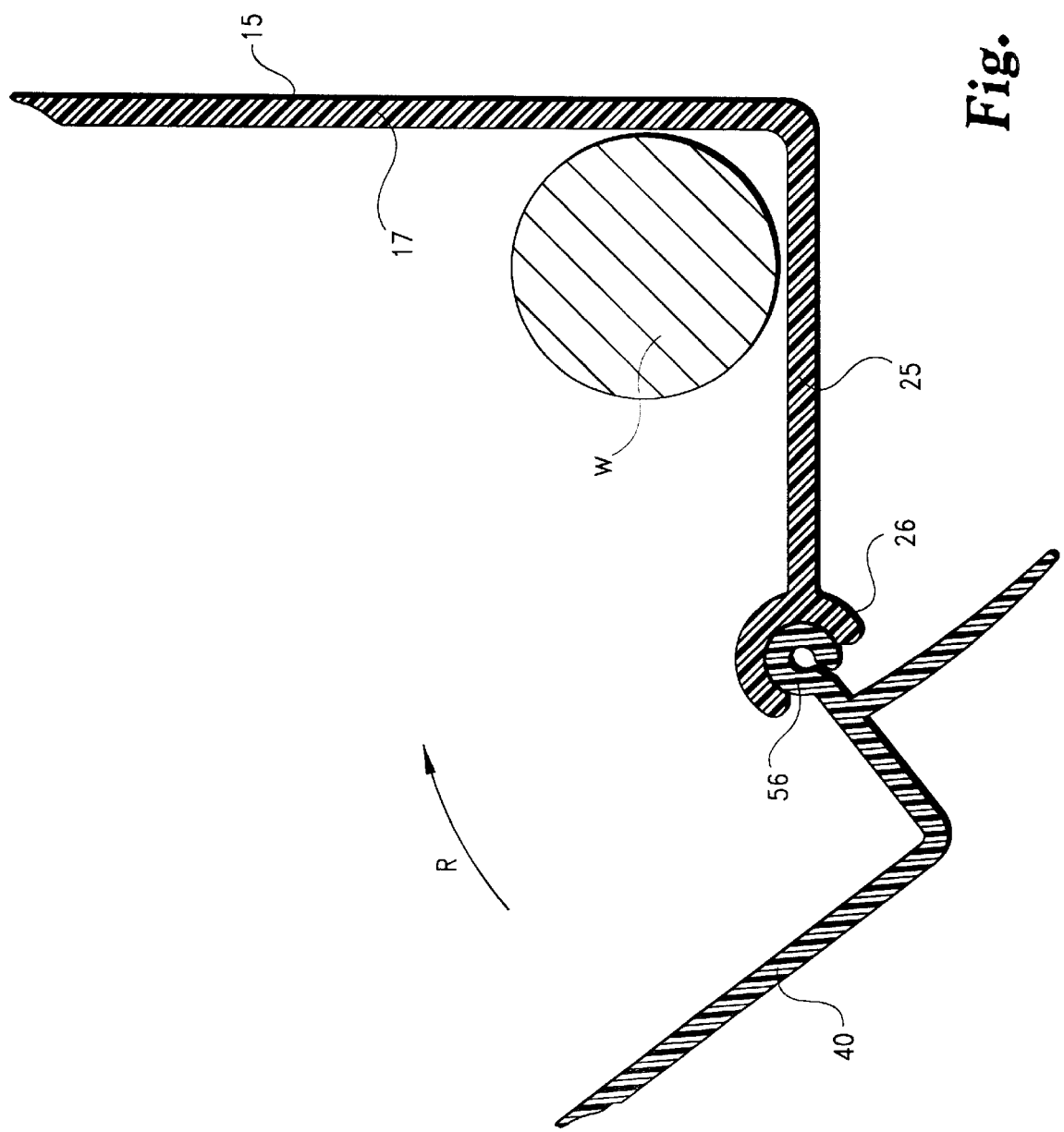
FIG. 6 is a partial side sectional view of in electrical raceway assembly according to one embodiment of the present invention.

Preferably, the rounded edge 56 is rotatingly receivable within the attachment receptacle 26 to facilitate snap fit engagement of the cover 40 to the raceway 15. In operation, the second portion 55; is first engaged to the raceway 15 at an angle that facilitates inserting the rounded edge 56 into the attachment receptacle 26 as shown in FIG. 6. The cover 40 is then rotated along the longitudinal axis $A_r$ (FIG. 2) of the receptacle 26 in the direction of arrow R until the groove 51 of the first portion 50 contacts the lip 21 of the side wall 20 and the lip 21 is forced into engagement with the receptacle 26 as shown in FIG. 1. The raceway 15 can be conveniently accessed without completely disengaging the cover 40 from the raceway 15. The lip 21 is removed from the receptacle 26 and then the cover 40 rotated in a direction opposite to direction of arrow R. After access is completed, cover 40 is closed as described.

A flange 60 extends from an end of the cover 40 and along the length l of the cover 40. The flange 60 provides a pass through for excess cord stored in the area a behind the flange 60 to provide a neat and pleasing work space. In the embodiment of FIG. 3, the flange 60 extends from and is adjacent to the second portion 55 of the cover 40.

Referring again to FIG. 1, the flange 60 is preferably integral with the face plate 45. In some embodiments, the flange 60 is recessed from the face plate 45. The flange 60 occludes an area a behind the flange 60 when the cover 40 is attached to the raceway 15. The flange 60 is relatively more flexible or pliable than other elements of the cover 10, which must be sufficiently rigid to prevent inadvertent detachment from the raceway 15. The flange 60 is elastically deformable to allow convenient access to the area a for storage of wires on the surface of the structure. That is, upon a pulling or pushing pressure, the flange 60 is deformable from its original shape shown in FIG. 1 to a deformed shape that exposes area a. The flange 60 than returns to its original, undeformed state when the deformation force is removed. The relative difference in rigidity allows the flange 60 to bend relative to other stiffer portions of the cover 40 so that the flange 60 is deformable while the cover 40 remains stationary and engaged to the raceway 15.

Providing an elastically deformable flange 60 integrally formed with a face plate 45 that is sufficiently rigid to maintain engagement with the raceway 15 can be accomplished by a dual durometer cover 40. The flange 60 preferably has an average durometer which is relatively lower than the average durometer of other elements of the cover 40, such as the face plate 45 and/or the first and second portions 50, 55 of the cover 40. It is contemplated that the flanges 60 will be made of a thermoplastic material having a durometer of less than about Shore 80, preferably from about Shore 30 to about Shore 50, and other portions of the cover 40 will preferably be made of a thermoplastic material having a durometer at least about 15 units greater within the range of about Shore 65 to about Shore 95, preferably from about Shore 80 to about Shore 90. All durometer measurements are in accordance with ASTMD 224D Shore A, 15 second delay. The dual durometer covers of this invention can be obtained using methods known in the art, such as co-extrusion processes.

Figure 2:
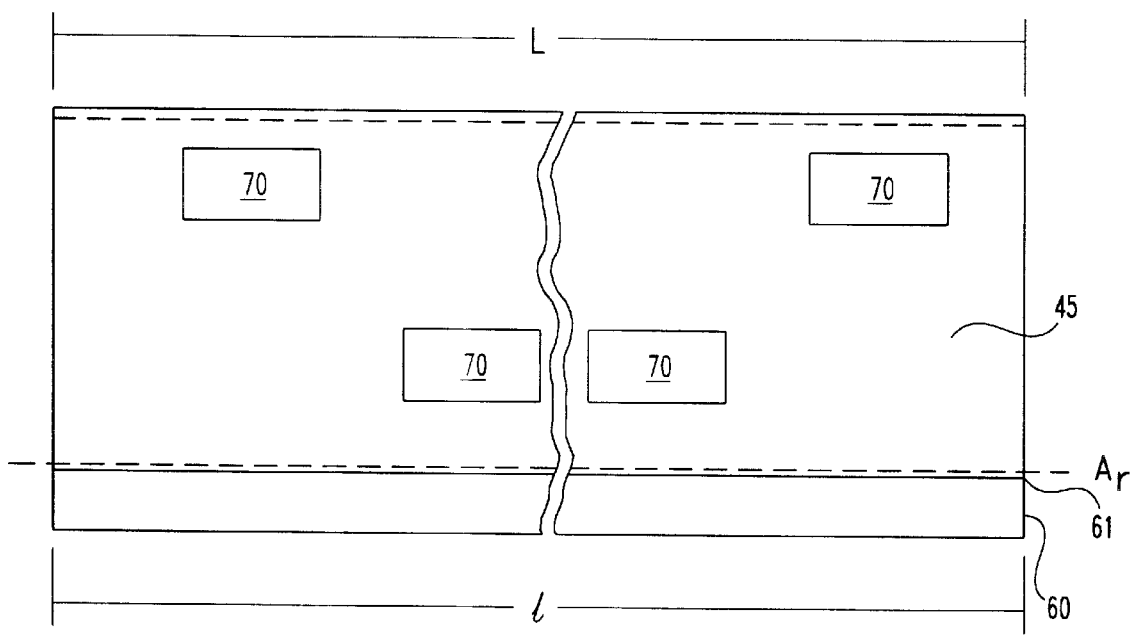
FIG. 2 is a front elevational view of an electrical raceway assembly.

Although a distinct line 61 is shown in FIGS. 1 and 2, between face plate 45 and flange 60, there need not be an exact line between the higher durometer material and the lower durometer material. If thermoplastic materials of different durometers are extruded together as is contemplated in one embodiment of this invention, there will most likely be a fusing of the materials resulting in a certain amount of blending in the zones between the higher and lower durometer thermoplastic materials. The exact position of the line or zone of demarcation between higher and lower durometer material can vary upward or downward along flange 60 so long as the objects of the present invention are achieved. Moreover, the blend lines may be located at different locations on the cover 40 so long as portions of the cover 40 are sufficiently rigid to maintain engagement with the raceway 15. For example, FIG. 7 shows blend lines 53, 58 within the first portion 50' and the second portion 55' of the cover 40' so that the attachment means, such as the rounded edge 56', are relatively rigid while the flange 60' is relatively flexible.

The covers of the present invention may be formed of any suitable material that accomplishes the features of this invention. Preferably, the covers are composed of a thermoplastic material, including synthetic and natural rubbers, plastics and the like. The particular material of the covers is not critical so long as the covers have portions that are sufficiently rigid to maintain snap fit engagement with the raceway until a removal force is applied, and the flange 60 is elastically deformable to allow temporary access to an area behind the flange and then return to an undeformed state occluding the area.

Figure 7:
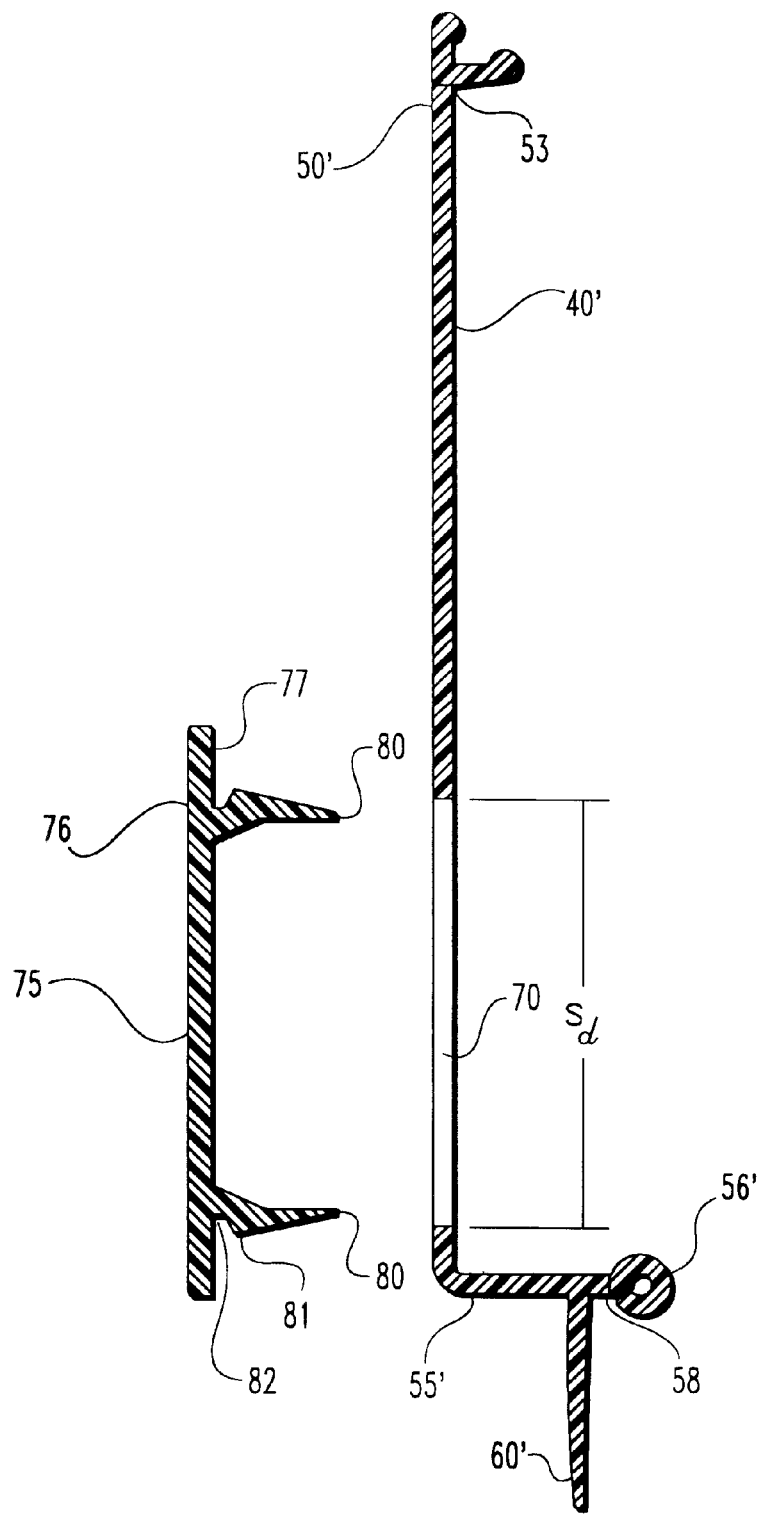
FIG. 7 is a side sectional view of a cover of this invention.
Figure 8:
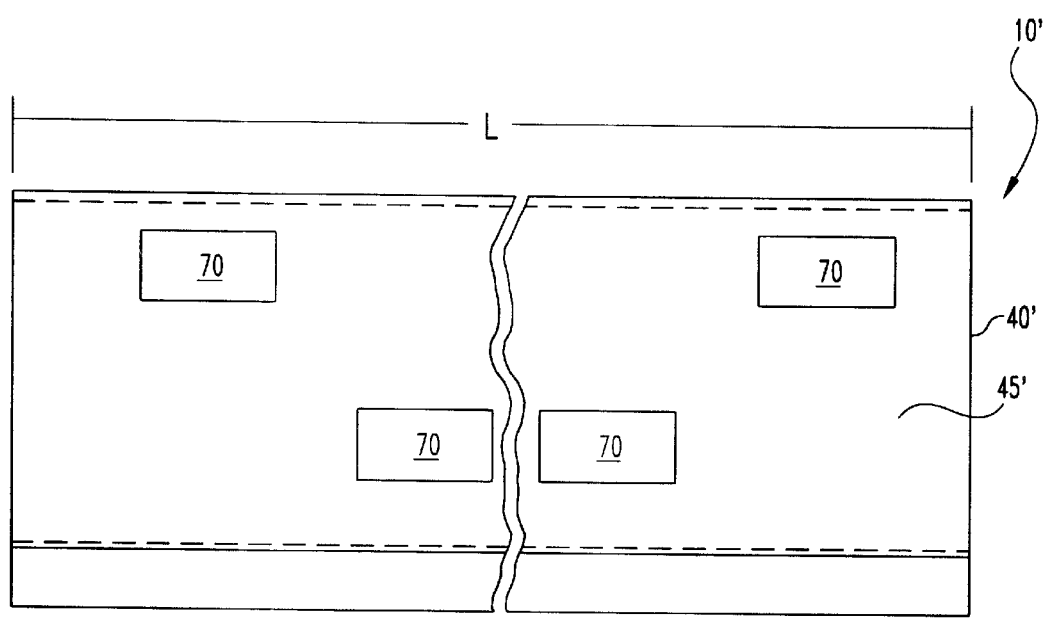
FIG. 8 is a front elevational view of an electrical raceway assembly.
Figure 9:
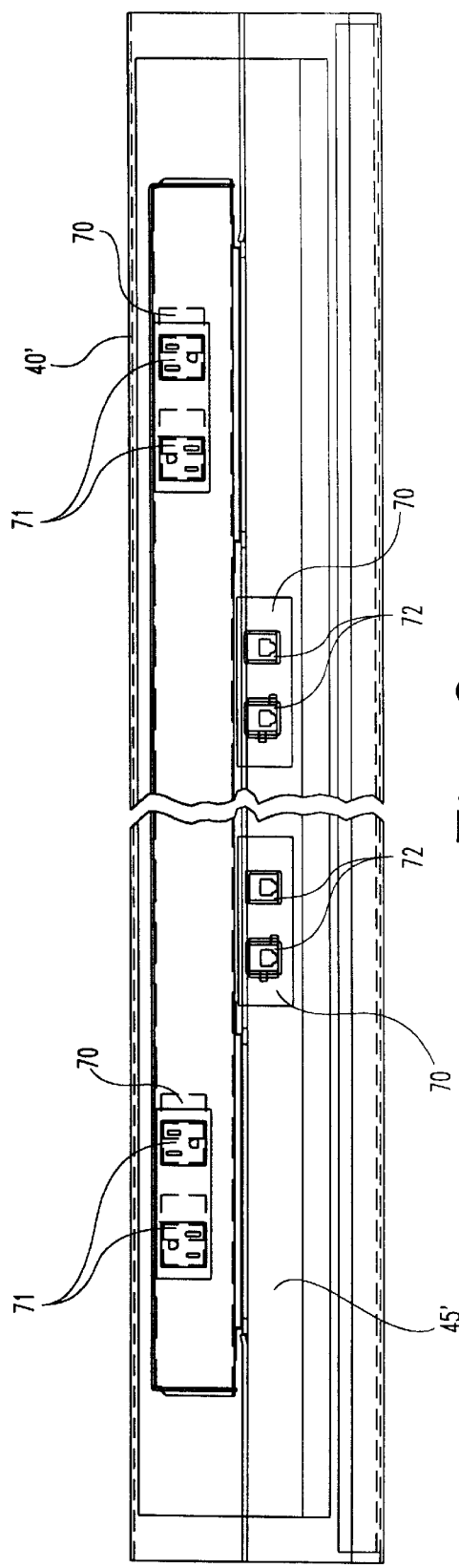
FIG. 9 is a front elevational view of an assembly according to one embodiment of this invention.

Referring now to FIGS. 7–9, in some embodiments, the face plate 45' of the cover 40' defines an access doorway 70 for accessing wires W, electrical outlets 71 and data jacks 72 disposed in the channel of the raceway. Preferably, the assembly 10' also includes, a door 75 detachably attachable to the face plate 45' to occlude the doorway 70. The door 75 includes front face 76 and a back face 77 so that the back face 77 faces the channel 30 when the door 75 is attached to the doorway 70.

The assembly 10' preferably includes attachment means for detachably attaching the door 75 to the face plate 45'. In the embodiment shown in FIG. 7, the attachment means includes a pair of oppositely spaced latch members 80 projecting outwardly from the back face 77. In this embodiment, the latch members 80 are perpendicular to a plane of the door 75. Each of the latch members 80 has a shoulder portion 81 facing the back face 77 and a groove 82 between the back face 77 and the shoulder portion 81.

Figure 10:
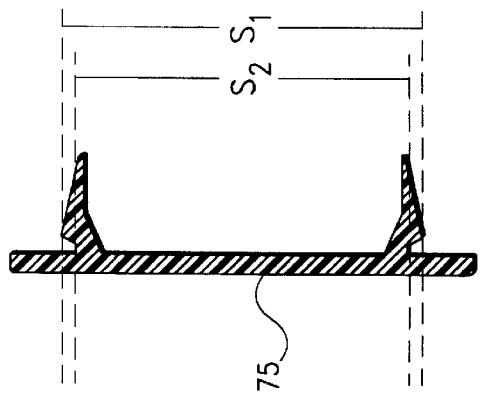
FIG. 10 is a side sectional view of a door for a face plate access doorway according to one embodiment of the present invention.

Referring now to FIGS. 7 and 10, the latch members 80 are configured for snap fit engagement within the doorway 70. Each pair of shoulder portions 81 together defines a first dimension $S_1$ that is larger than a second dimension $S_2$ formed between each pair of grooves 82. The first dimension $S_1$ is larger than a length $S_d$ of the doorway 70 and the second dimension $S_2$ is slightly smaller than the length $S_d$ of the doorway 70 so that the door 75 is snap fittable within the doorway 70 to occlude the doorway 70.

Preferably, there is a difference in rigidity between the latch members 80 and the face plate 45' to allow the shoulder portions 81 to be forced past the smaller dimensioned doorway 70. In one embodiment, the face plate 45' is relatively more flexible than the latch members 80. This may be accomplished by using materials having characteristics that influence rigidity such as thickness and durometer. For example, the face plate 45' may have an average durometer that is relatively lower than the average durometer of the door 75.

In this embodiment, the door 75 is substantially or nearly flush to the face plate 45 so that the assembly 10' has a smooth and streamlined appearance, which does not detract from the overall aesthetics and appearance of the work space. At the same time, each of the doors 75 can be can be opened as desired to provide convenient access to portions of the raceway channel 30' so as to permit access to power blocks or communication cables therein.

Figure 11:
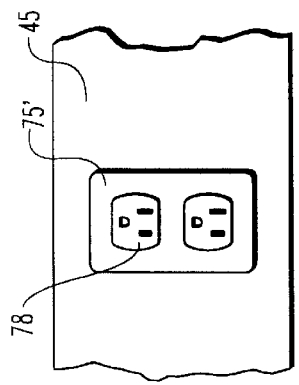
FIG. 11 is a partial front elevational view of a cover and door according to one embodiment of this invention.

In some embodiments as shown in FIG. 11, door 75' may be provided with additional features, such as electrical outlets 78, six-pin telephone jacks, eight-pin keyed telephone jacks, BNC coaxial data connectors, dual-coaxial connectors, TNC coaxial data connectors, subminiature D 25-pin data connectors for twisted pair or ribbon cable, connectors for fiber optic cables and the like.

Figure 12:
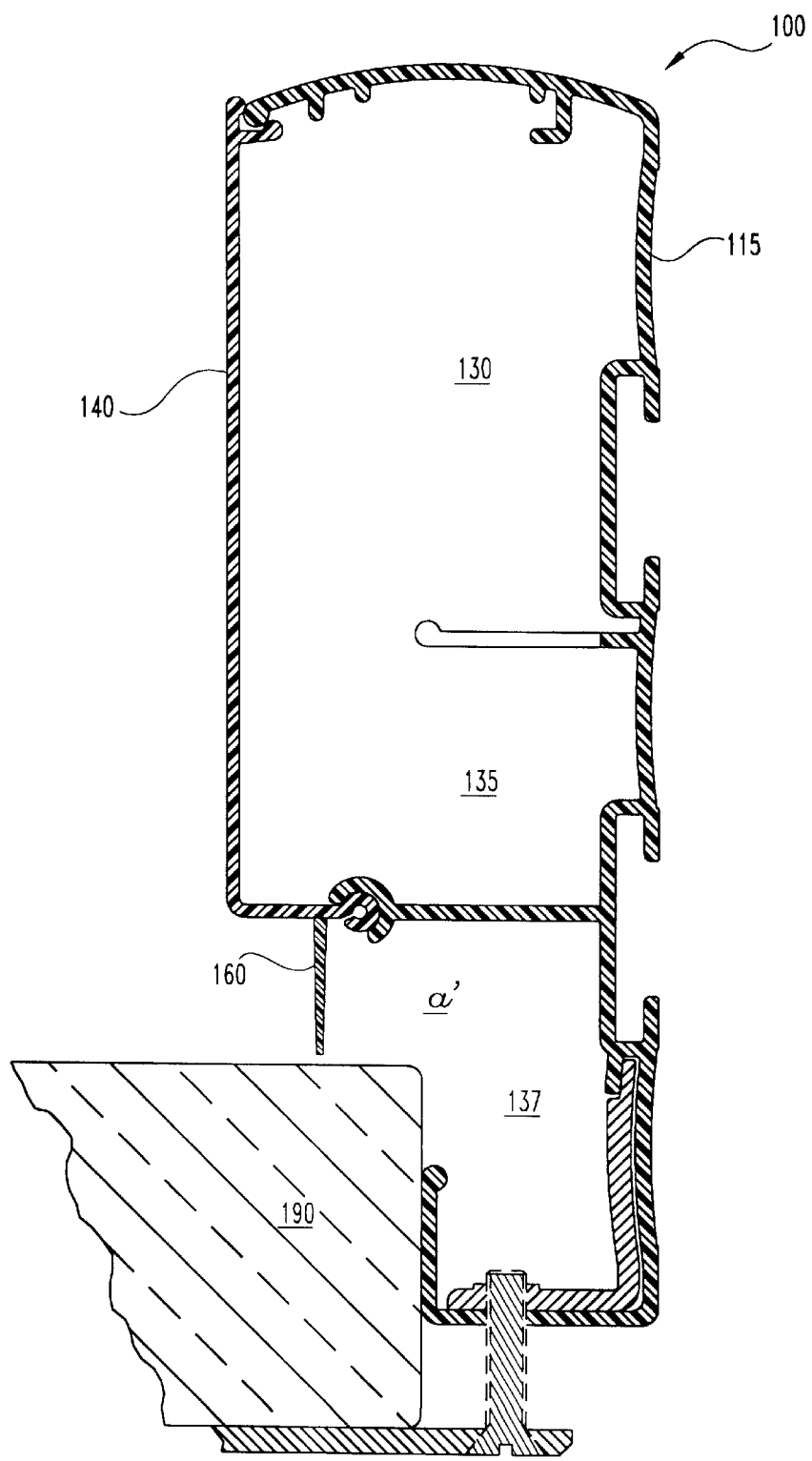
FIG. 12 is a side sectional view of an electrical raceway assembly according to one embodiment of this invention.
Figure 13:
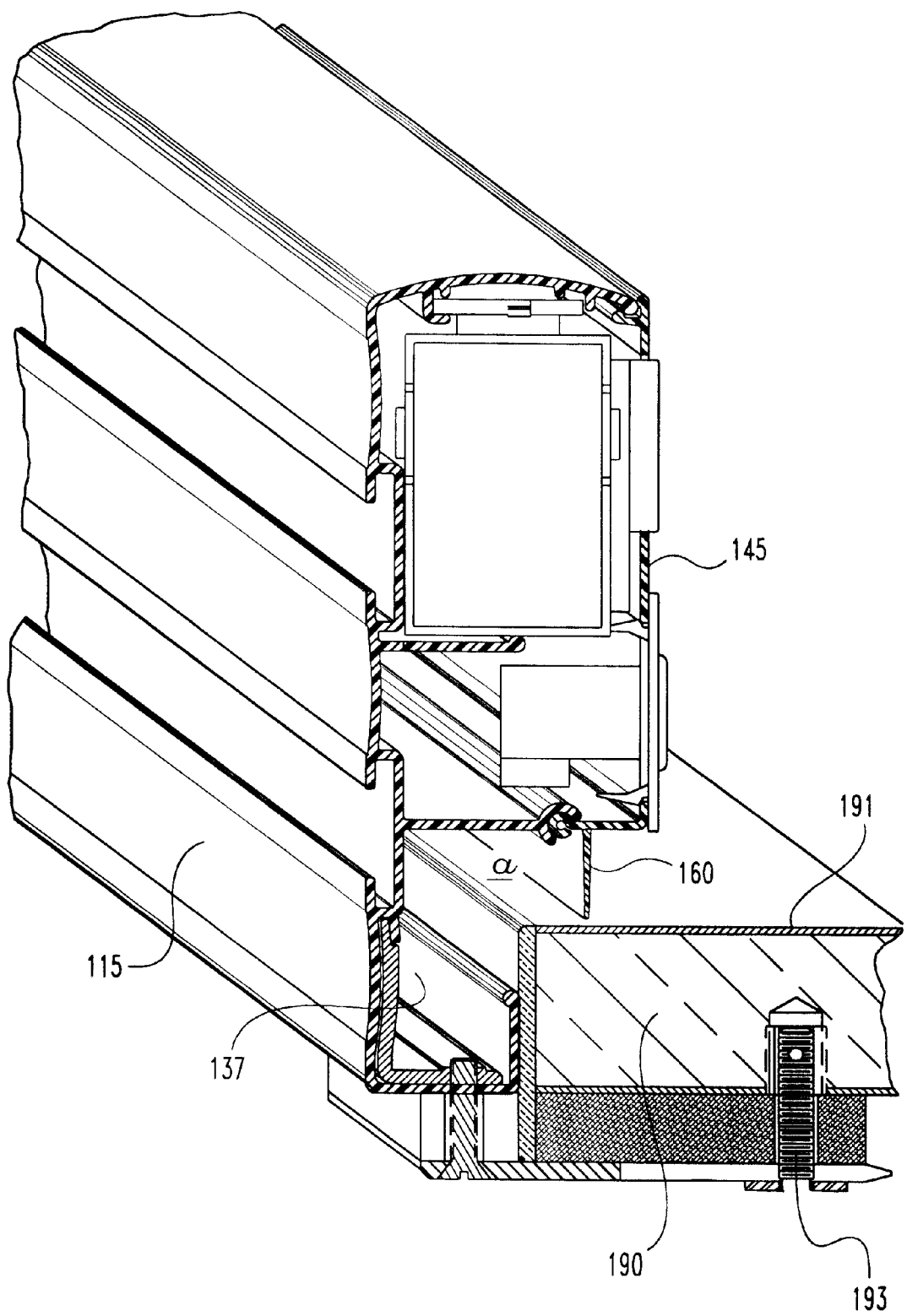
FIG. 13 is a partial sectional view of an assembly of this invention engaged to the top of a structure.

In preferred embodiments, the raceway 115 defines at least one other channel 135 in addition to the first channel 130 as shown in FIG. 12. In some cases it is desirable to house electrical wires in one channel and communication wires in another. In this assembly 100, the raceway 115, also includes an open track channel 137 that defines an area a'. Area a' is partially occluded by flange 160 when the cover 140 is attached to the raceway 115. In this preferred embodiment, the flange 160 contacts or approaches the surface 191 of the structure, such as a desk or table 190 as depicted in FIG. 13. The flange 160 provides a visible seal between the face plate 145 and the surface 191 yet allows access to the open channel 137 to store cords from tools, such as a computer or phone, on the table 190. The open channel 137 can also be used as an additional guide for wires and cords to desk top tools.

Figure 14:
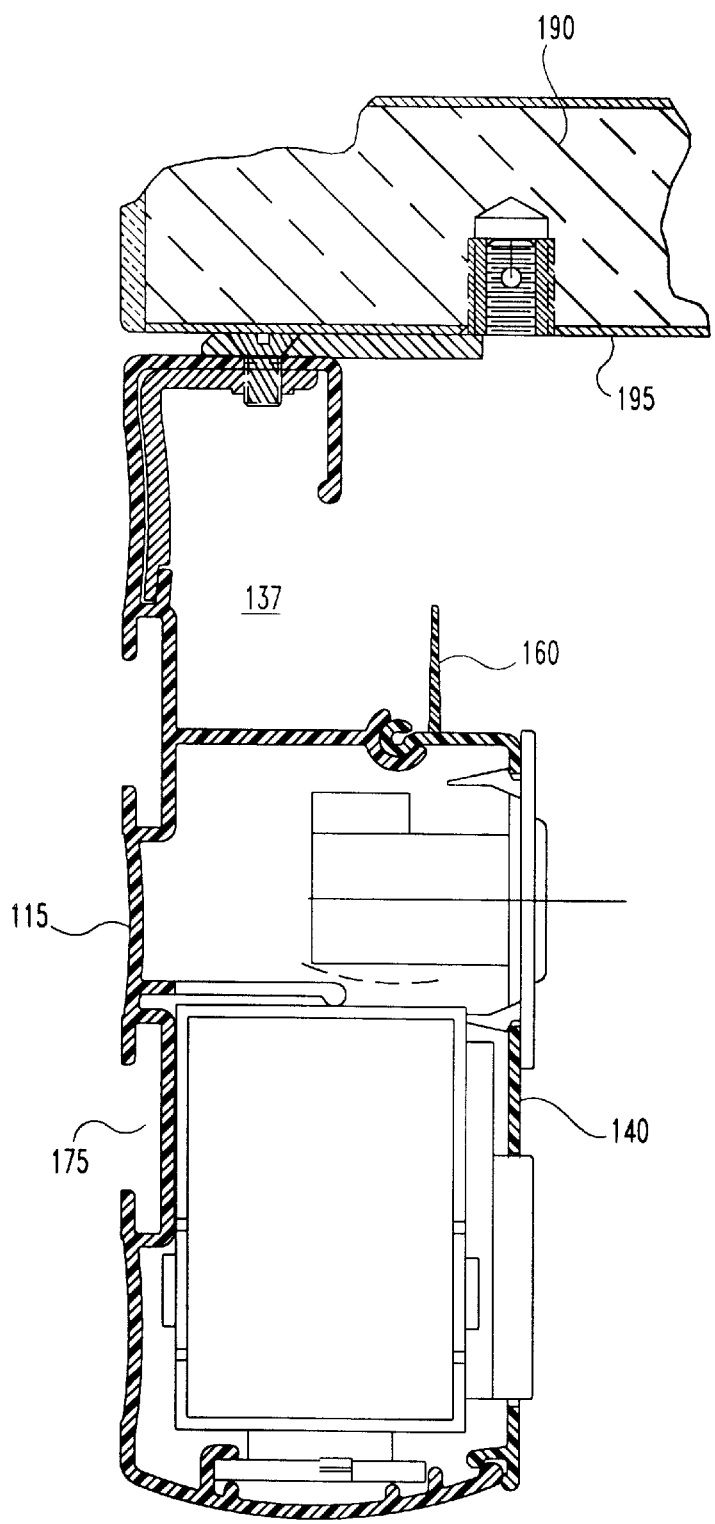
FIG. 14 is a partial sectional view of an assembly of this invention engaged to the underside of a structure.
Figure 15:
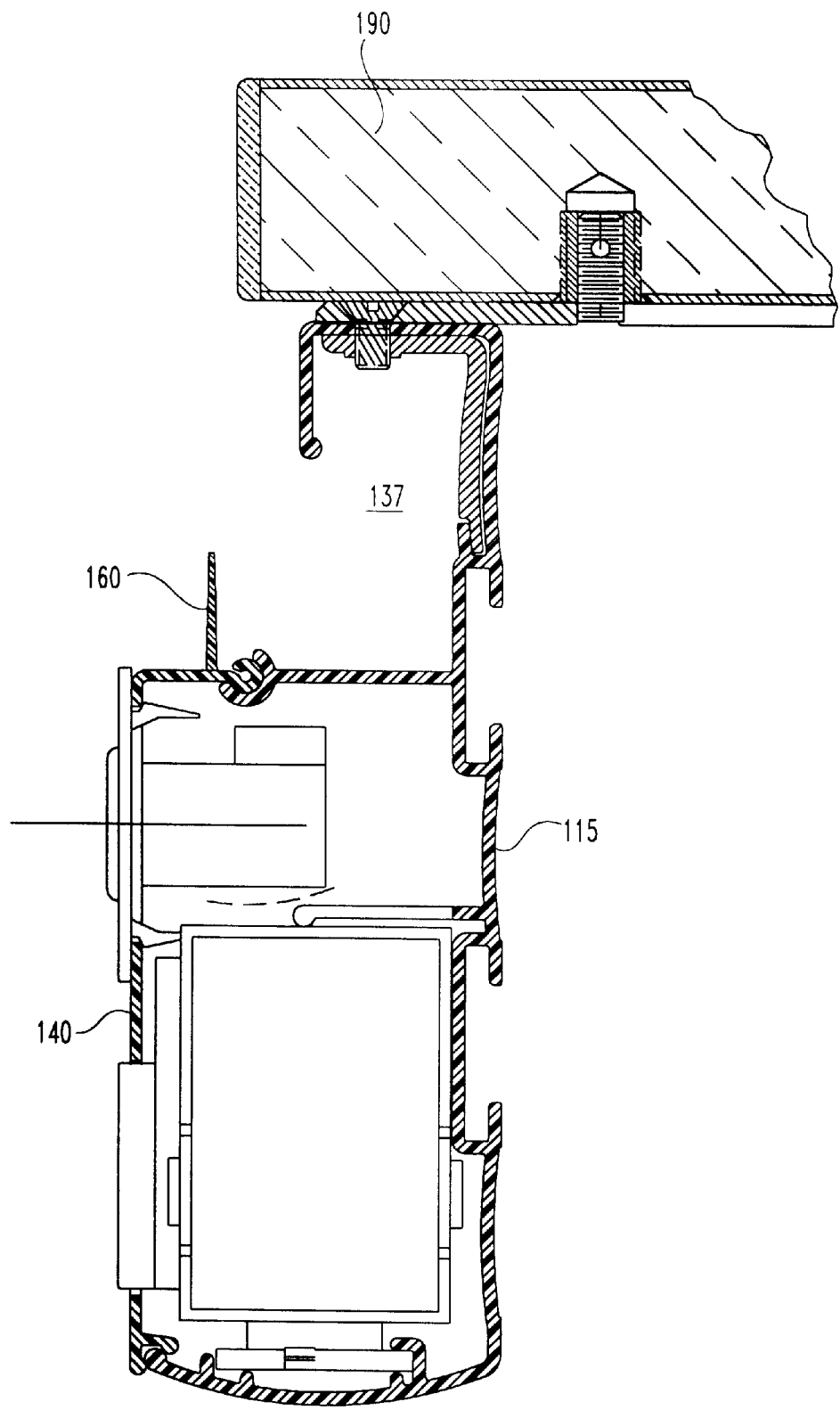
FIG. 15 is a partial sectional view of an assembly of this invention engaged to the underside of a structure.

As shown in FIG. 13, raceway 115 is fastened to the surface 191 of a desk, wall, baseboard, or other suitable structure with a suitable fastener 193. In this embodiment, the raceway 115 and cover 140 form a back panel to the structure 190. The assemblies of this invention may also be fastened below the structure 190 to serve as a modesty panel as shown in FIGS. 14 and 15. In FIG. 14, the open channel 137 is exposed to the area beneath the structure 190. This configuration is useful in structures defining grommets (not shown) through the surface for wires to extend from the open channel 137, through the grommet to the surface 191 of the structure 190. In FIG. 15, the open channel 137 is open behind the structure 190. This configuration can be used to deliver wires from the open channel 137 to the back of the structure 190 and onto the surface 191. In embodiments similar to those shown in FIGS. 14 and 15, it may be desirable to lengthen the flange 160 to further occlude the open channel 137 yet still allow access. In still other embodiments, the assembly 100 can be incorporated into other structures, such as a wall panel. The flange 160 can be positioned to contact or approach the floor for capturing excess cords.

The raceways of this invention are preferably formed of a suitable rugged sheet metal material capable of being easily formed and shaped but not readily bent or abused. Any suitable tough, resilient material which possesses form-sustaining rigidity upon being formed and which exhibits sufficient flexibility to provide the connection upon installation as described may be used to form the assembly.

Figure 16:
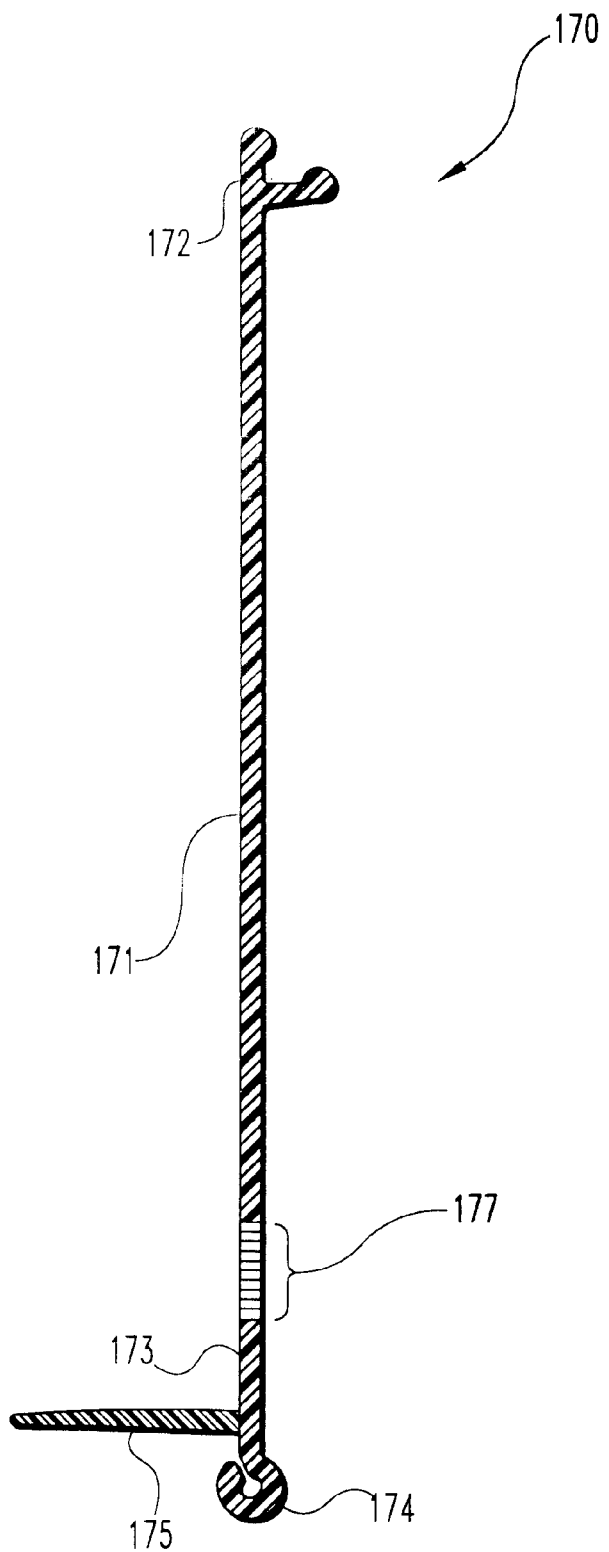
FIG. 16 is a sectional side elevational view of a cover for an electrical raceway according to a further embodiment of the present invention.

In a further embodiment of the invention, a raceway cover 170, depicted in FIG. 16, is provided that includes an additional region of greater flexibility. The cover 170 includes a face plate 171, an upper portion 172 and a lower portion 173. The upper portion 172 can be configured like the first portion 50 of the cover 40 shown in the previous figures. Likewise, the lower portion 173 can be configured according to the second portion 55 of the previous cover 40 to include the rounded edge 174 and the flexible flange 175.

As thus far described, the cover 170 is similar to the cover 40 and can be used in the same manner. As shown in FIG. 14, the cover 40 or 170 can be engaged to a raceway 115 mounted underneath a surface of a desk or table. As illustrated in this figure, the raceway opens underneath the table to fully conceal the sockets, cables and wires contained by the raceway 115. In order to gain access to the raceway, the cover 40 can be pivoted upward about its rounded edge 56. However, with the cover 40 of the previous embodiment, the underside surface 195 of the table 190 restricts how far the cover 40 can be rotated, which thereby restricts access to the raceway 115.

In order to address this difficulty, the cover 170 of the embodiment shown in FIG. 16 includes an additional portion 177 of greater flexibility between the face plate 171 and the lower portion 173. The portion 177 acts as a living hinge to be resiliently deformed so that the face plate 171 can pivot relative to the lower portion 173.

Figure 17:
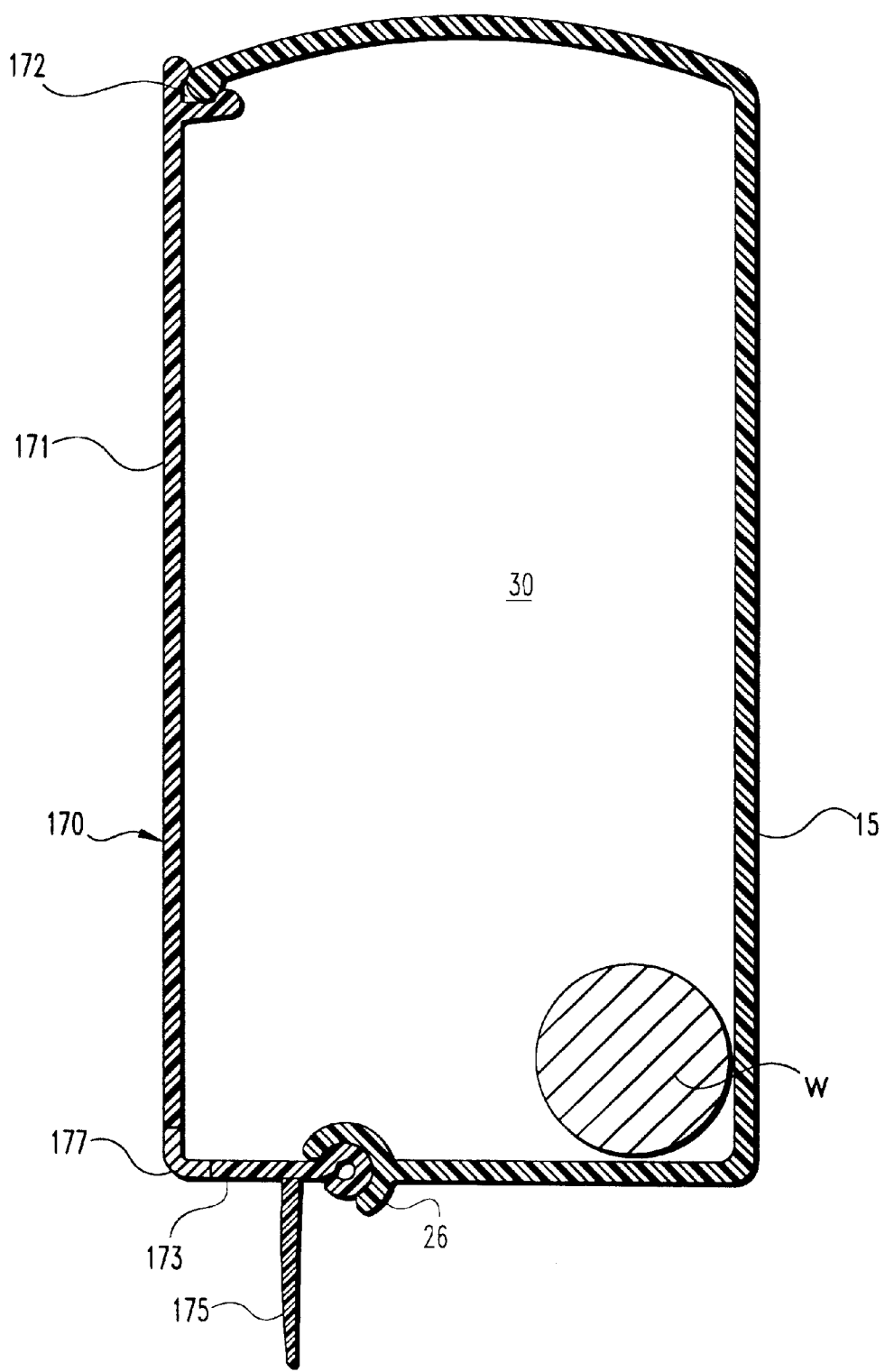
FIG. 17 is a sectional side elevational view of the cover shown in FIG. 16 attached to an electrical raceway.
Figure 18:
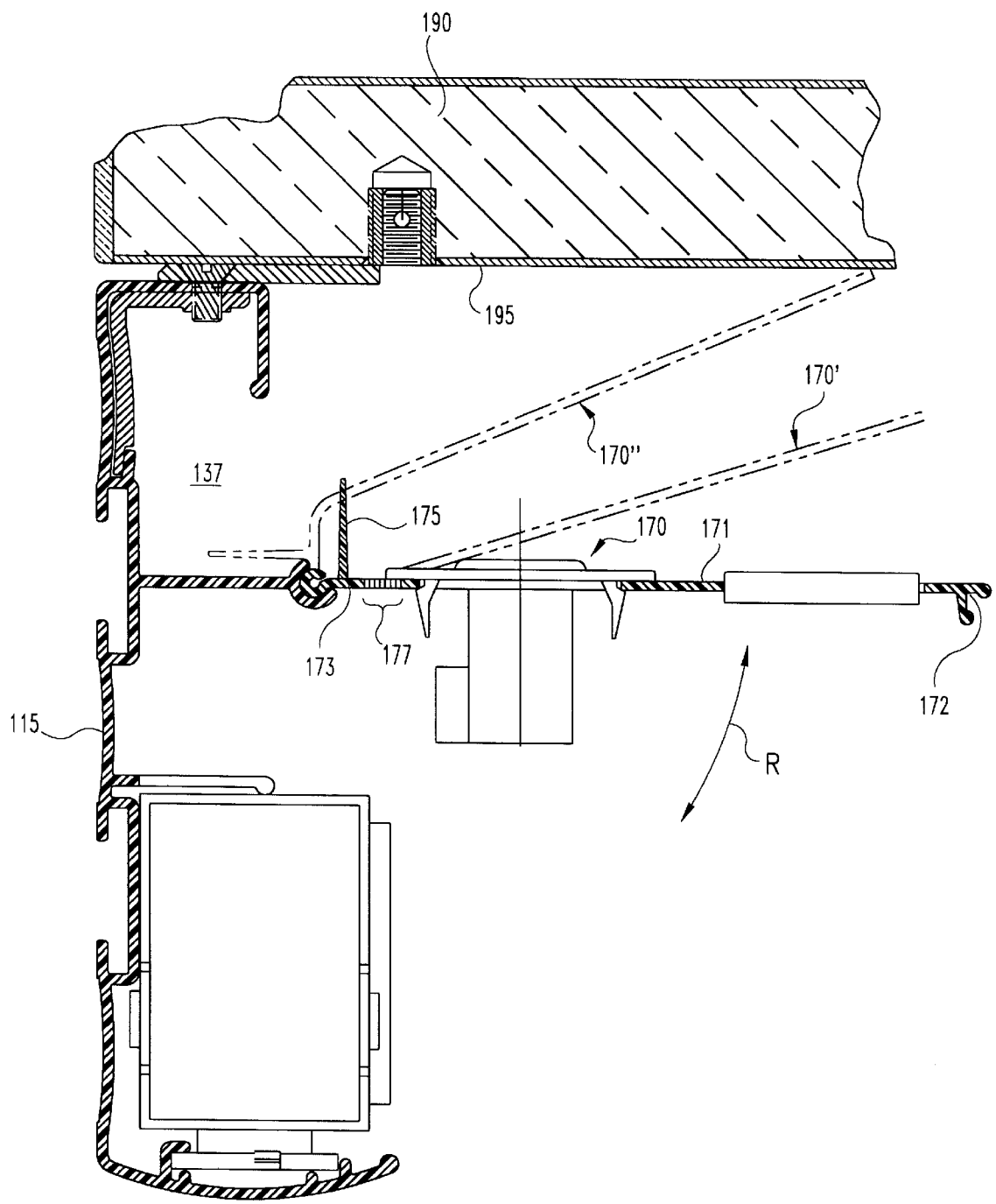
FIG. 18 is a partial section side elevational view of the cover shown in FIG. 16 attached to an electrical raceway under a desk surface with the cover rotated to an open position.

In one operative position shown in FIG. 17., the cover 170 is engaged at its upper portion 172 and lower portion 173 to a raceway 15. The cover 170 can be similarly engaged to a raceway 115, as shown in FIG. 18. In this operative position, the hinge portion 177 is flexed or bent at generally a right angle. In this position, the cover 170 is firmly engaged to the raceway to form the channel 30.

When the cover 170 is used with a raceway 115 mounted underneath a table 190, as shown in FIG. 18, the living hinge portion 177 exhibits its additional functionality. In particular, the face plate 171 can be rotated in the direction of the arrows R about the hinge portion 177. With this motion, the lower portion 173, and particularly the rounded edge 174 need not pivot about the raceway 115. The face plate 171 can be pivoted further about the living hinge 177 until the cover is in the position 170'.

If it is desired, the cover 170 can be pivoted about the lower portion 173 while the face plate 171 is pivoted relative to the living hinge portion 177 to reach the position 170". In this position, the end of the cover 170" can be just at the bottom surface 195 of the desk or table 190. The living hinge 177 thus allows the cover 170 to be moved completely clear of the opening of the raceway 115 to permit unfettered access to the electrical components housed therein.

The present invention economically and conveniently provides accommodations for electronic equipment in work spaces, which enhance the utility of office structures. The raceway assemblies of this invention guide wires to their outlets and provide table top access to power supply and communication ports. The devices of the present invention enhance the utility of office structures in an aesthetically pleasing manner and improve the quality of the work environment.

While the invention has been illustrated and described in detail in the drawings and foregoing description, the same is to be considered as illustrative and not restrictive in character. It should be understood that only the preferred embodiments have been shown and described and that all changes and modifications that come within the spirit of the invention are desired to be protected.

What is claimed:

1. An electrical raceway assembly for use with a structure, comprising:
   an elongated raceway engageable to the structure and having a length, a transverse base and a pair of opposite upstanding sidewalls extending along said length to define at least one channel configured for retaining electrical wires;

a cover attachable to said raceway to occlude at least a portion of said at least one channel, said cover including an elongated face plate having an interior surface and an exterior surface, said face plate further having a first portion and an opposite second portion, each said portion extending along a length of said face plate and attachment means for pivotally attaching one of said first and second portions of said face plate to one of said opposite upstanding sidewalls so that said interior surface faces said channel, said cover pivotable about said attachment means when said attachment means is engaged to said one of said opposite upstanding sidewalls; and a hinge portion integral with said face plate and disposed adjacent said attachment means.

2. The assembly of claim 1 wherein said face plate includes second attachment means at the other of said first and second portions for releasably attaching said cover to the other of said upstanding side walls.

3. The assembly of claim 1 wherein said other of said side walls of said raceway terminates in a lip, said lip including a rounded surface having a radius; and said second attachment means of said cover includes a groove defined in said other of said first and second portions configured for snap fit engagement with said lip.

4. The assembly of claim 3 wherein:

said one of said side walls of said raceway terminates in an elongated attachment receptacle; and said attachment means of said cover includes a rounded edge of said one of said first and second portions receivable within said attachment receptacle, said rounded edge configured for snap fit engagement within said receptacle.

5. The assembly of claim 4 wherein said attachment receptacle defines a curved interior portion having an internal radius slightly larger than said radius of said rounded edge for mating with said rounded edge and said rounded edge is rotatingly receivable within said attachment receptacle.

6. The assembly of claim 1 wherein said cover includes a flange extending from said one of said first and second portions of said cover and configured to occlude an area behind said flange when said cover is attached to said raceway.

7. The assembly of claim 6 wherein said flange is recessed relative to said face plate.

8. The assembly of claim 6 wherein said flange is formed of an elastically deformable material.

9. The assembly of claim 1 wherein said face plate is formed of a material having a first average durometer and said hinge portion is formed of a material having a second average durometer less than said first average durometer.

10. The assembly of claim 9, wherein said face plate and said hinge portion are formed of the same material.

11. The assembly of claim 9, wherein said cover is formed by extrusion.

12. A cover for occluding channels in an electrical wire raceway, comprising:

an elongated face plate having an interior surface and an exterior surface, said face plate further having a first portion and an opposite second portion;

said first portion defining an attachment element configured for pivotably attaching said faceplate to an end of the raceway so that said interior surface faces the interior of the raceway, said cover pivotable about said attachment element when said attachment element is engaged to said end of said raceway; and a hinge portion integral with said face plate and disposed between said second portion and said attachment element, said hinge having an average durometer relatively lower than the average durometer of said face plate.

13. An electrical raceway assembly for use with a structure, comprising:

an elongated raceway engageable to the structure and having a length, a transverse base and a pair of opposite upstanding sidewalls extending along said length to define at least one channel configured for retaining electrical wires;

a cover attachable to said raceway to occlude at least a portion of said at least one channel, said cover including an elongated face plate having an interior surface and an exterior surface, said face plate further having a first portion and an opposite second portion, each said portion extending alone a length of said face plate and attachment means for pivotally attaching one of said first and second portions of said face plate to one of said opposite upstanding sidewalls so that said interior surface faces said channel; and a hinge portion disposed at a position on said cover relative to said attachment means to permnit said first portion and said second portion to be arranged substantially perpendicular to each other when said cover is attached to said raceway.

14. A cover for occluding channels in an electrical wire raceway, comprising:

an elongated face plate having an interior surface and an exterior surface, said face plate further having a first portion and an opposite second portion;

said first portion defining an attachment element configured for pivotally attaching said faceplate to an end of the raceway so that said interior surface faces the interior of the raceway; and a hinge portion integral with said face plate and disposed between said second portion and said attachment element and arranged relative to said attachment element to permit said first portion and said second portion to be arranged substantially perpendicular to each other when said cover is attached to the raceway, said hinge having an average durometer relatively lower than the average durometer of said face plate.

* * * * *

UNITED STATES PATENT AND TRADEMARK OFFICE
CERTIFICATE OF CORRECTION

PATENT NO. : 6,348,660 B1
DATED : February 19, 2002
INVENTOR(S) : David R. Gutgsell, Kenneth A. Kern and Lawrence Rapier It is certified that error appears in the above-identified patent and that said Letters Patent is hereby corrected as shown below:

<u>Column 2,</u>
Line 26, replace "demned" with -- defined --

<u>Column 3,</u>
Line 15, replace "cm" with -- an --

<u>Column 5,</u>
Line 30, replace "10" with -- 40 --

<u>Column 10,</u>
Line 37, replace "permnit" with -- permit --

Signed and Sealed this

Seventeenth Day of December, 2002

JAMES E. ROGAN
*Director of the United States Patent and Trademark Office*